United States Patent
Fluet et al.

(10) Patent No.: US 9,672,127 B2
(45) Date of Patent: Jun. 6, 2017

(54) BUS INTERFACE SYSTEM FOR INTERFACING TO DIFFERENT BUSES

(71) Applicant: Teradyne, Inc., North Reading, MA (US)

(72) Inventors: Michael Thomas Fluet, Litchfield, NH (US); Peter Hansen, Peabody, MA (US); Pavel Gilenberg, Needham, MA (US)

(73) Assignee: Teradyne, Inc., North Reading, MA (US)

( * ) Notice: Subject to any disclaimer, the term of this patent is extended or adjusted under 35 U.S.C. 154(b) by 96 days.

(21) Appl. No.: 14/688,587

(22) Filed: Apr. 16, 2015

(65) Prior Publication Data

US 2016/0306724 A1    Oct. 20, 2016

(51) Int. Cl.
*G06F 11/22*    (2006.01)
*G06F 11/273*    (2006.01)

(52) U.S. Cl.
CPC ........ *G06F 11/221* (2013.01); *G06F 11/2733* (2013.01)

(58) Field of Classification Search
CPC ...... G06F 11/25; G06F 11/263; G06F 11/267; G06F 11/3423; G06F 11/322; G01R 31/31907; G01R 31/31726; G01R 31/02; G01R 31/31725; G01R 31/3177; G01R 31/2884; G01R 31/3163
See application file for complete search history.

(56) References Cited

U.S. PATENT DOCUMENTS

| 4,402,055 A | * | 8/1983 | Lloyd | ................ G01R 31/2834 324/73.1 |
| 4,760,330 A | * | 7/1988 | Lias, Jr. | ........... G01R 31/31926 714/32 |
| 4,868,785 A | * | 9/1989 | Jordan | ............... G01R 31/2834 345/440 |

(Continued)

FOREIGN PATENT DOCUMENTS

WO    WO-2006/071975 A1    7/2006

OTHER PUBLICATIONS

International Search Report for PCT/US2016/026111, 3 pages (Jul. 18, 2016).
Written Opinion for PCT/US2016/026111, 9 pages (Jul. 18, 2016).

*Primary Examiner* — Nadeem Iqbal
(74) *Attorney, Agent, or Firm* — Choate, Hall & Stewart LLP; Paul Pysher

(57) ABSTRACT

An example test system includes a bus interface to connect to a bus of a computer system; and test instruments to perform one or more test operations on a UUT, where the test instruments connect to the bus interface to enable communication between the computer system and the test instruments via the bus interface. At least one test instrument includes: ports to which the UUT is connectable, with each of the ports interfacing to a corresponding peripheral bus supported by the at least one test instrument; circuits to connect the bus interface to the peripheral buses, with each circuit being configured to convert between a bus interface protocol run on the bus interface and a peripheral bus protocol run on a peripheral bus; and a switch to identify a target circuit of the circuits, with the switch to direct communications between the computer system and the target circuit.

22 Claims, 3 Drawing Sheets

(56) References Cited

U.S. PATENT DOCUMENTS

| | | | |
|---|---|---|---|
| 5,155,836 A * | 10/1992 | Jordan | G01R 31/2834 703/13 |
| 5,223,788 A * | 6/1993 | Andreano | G01R 31/008 324/73.1 |
| 5,832,244 A | 11/1998 | Jolley et al. | |
| 6,966,019 B2 * | 11/2005 | Viens | G01R 31/31907 714/724 |
| 7,308,608 B1 | 12/2007 | Pleis et al. | |
| 2002/0183956 A1 | 12/2002 | Nightingale | |
| 2003/0196153 A1 * | 10/2003 | Evans | G01R 31/31926 714/742 |
| 2006/0161827 A1 * | 7/2006 | Gohel | G01R 1/36 714/736 |
| 2010/0023294 A1 * | 1/2010 | Fan | G01R 31/2834 702/123 |
| 2011/0194425 A1 | 8/2011 | Li et al. | |
| 2012/0290246 A1 | 11/2012 | Bhatnagar et al. | |

* cited by examiner

BUS INTERFACE SYSTEM FOR INTERFACING TO DIFFERENT BUSES

TECHNICAL FIELD

This specification relates generally to a bus interface system.

BACKGROUND

A test system may include a test computer, such as a personal computer (PC). A test system user may use peripheral buses from the test computer to connect directly with a unit under test (UUT). Such a testing configuration can sometimes create functional and logistical problems for the test system user. For example, functionally, connecting a peripheral bus (e.g., an Ethernet bus) directly to the UUT can put the test computer at risk. In some cases, the direct connection can make the test computer vulnerable to malfunctions of the UUT, which can potentially damage the test system. Logistically, there may also be problems associated with connecting the test computer directly to the UUT. For example, computers typically have a shorter lifespan than UUTs, which can affect compatibility between the two. In a related issue, computer system buses may change over time, making it difficult to find a computer capable of servicing a legacy peripheral bus used on a UUT. This compatibility issue can constrain selection of new test computers, e.g., to older models that support legacy peripheral buses. Also, the test computer may not be located in close proximity to a UUT interface, making direct connection between the UUT and the test computer difficult.

SUMMARY

An example test system comprises a bus interface to connect to a bus of a computer system; and test instruments to perform one or more test operations on a unit under test (UUT), where the test instruments connect to the bus interface to enable communication between the computer system and the test instruments via the bus interface. At least one test instrument can include: ports to which the UUT is connectable, with each of the ports interfacing to a corresponding peripheral bus supported by the at least one test instrument; circuits to connect the bus interface to the peripheral buses, with each circuit being configured to convert between a bus interface protocol run on the bus interface and a peripheral bus protocol run on a peripheral bus; and a switch to identify a target circuit of the circuits, with the switch being to direct communications between the computer system and the target circuit. The example test system may include one or more of the following features, either alone or in combination.

The switch may be configured to identify the target circuit based on contents of one more data packets that comprise the communication. The contents of the one or more data packets may comprise a header of the one or more data packets, which comprises data corresponding to the target circuit. Each circuit may be configured to identify a communication from the UUT in a peripheral protocol, and to convert the communication from the peripheral protocol to the bus interface protocol.

The circuits may comprise one or more of an Ethernet controller, an RS232 bridge, a USB3 bridge, a SATA bridge, a Firewire bridge, a VGA bridge, an HDMI bridge, a DVI bridge, a DisplayPort bridge, a USB2 bridge, a SCSI bridge, an Audioport bridge, or a Thunderbolt bridge.

The circuits and switch may be hardware-compatible with the computer system such that, from a perspective of the computer system, the circuits and switch appear to be part of the computer system. An operating system of the computer system may detect and support the circuits as if the circuits were ports of the computer system. The operating system may include one or more drivers to support one or more bus protocols not supported by the operating system.

The test system may include the computer system. The computer system may comprise memory storing instructions that are executable and one or more processing devices to execute the instructions to run one or more tests on the UUT, with the communication being part of the one or more tests. The instructions may be part of a test program configured to provide support for one or more of the peripheral buses and corresponding ports. The test program may be configured to override an operating system of the computer system in order to provide the support for the one or more peripheral buses and corresponding ports.

The circuits may be implemented on a single hardware device. The circuits may be implemented on multiple hardware devices.

An example method of performing bus testing uses a system comprising (i) a bus interface connect to a bus of a computer system; and (ii) test instruments to perform one or more test operations on a unit under test (UUT), where the test instruments connect to the bus interface to enable communication between the computer system and the test instruments via the bus interface. The example method comprises: receiving, at a switch and over the bus interface, a communication from the computer system, with the communication being directed to one of multiple peripheral buses supported by the at least one test instrument; identifying, via a switch, a conversion circuit corresponding to a target peripheral bus to which the communication is directed; converting, via the conversion circuit, the communication from a bus interface protocol run on the bus interface to the target protocol; and outputting the communication, following conversion, from the conversion circuit to the target peripheral bus. The example method may include one or more of the following features, either alone or in combination.

The switch may identify the conversion circuit based on contents of one more data packets that comprise the communication. The contents of the one or more data packets may comprise a header of the one or more data packets, the header comprising data corresponding to the target circuit. The conversion circuit may identify a communication from the UUT in a peripheral protocol, and convert the communication from the peripheral protocol to the bus interface protocol.

The conversion circuit may comprise one or more of the following: an Ethernet controller, an RS232 bridge, a USB3 bridge, a SATA bridge, a Firewire bridge, a VGA bridge, an HDMI bridge, a DVI bridge, a DisplayPort bridge, a USB2 bridge, a SCSI bridge, an Audioport bridge, or a Thunderbolt bridge.

The conversion circuit and the switch may be hardware-compatible with the computer system such that, from a perspective of the computer system, the conversion circuit and switch appear to be part of the computer system.

The computer system may comprise memory storing instructions that are executed by one or more processing devices to run one or more tests on the UUT, with the communication being part of the one or more tests. The instructions may be part of a test program configured to provide support for one or more of the peripheral buses and corresponding ports. The test program may be configured to override an operating system of the computer system in order to provide the support for the one or more peripheral buses and corresponding ports.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
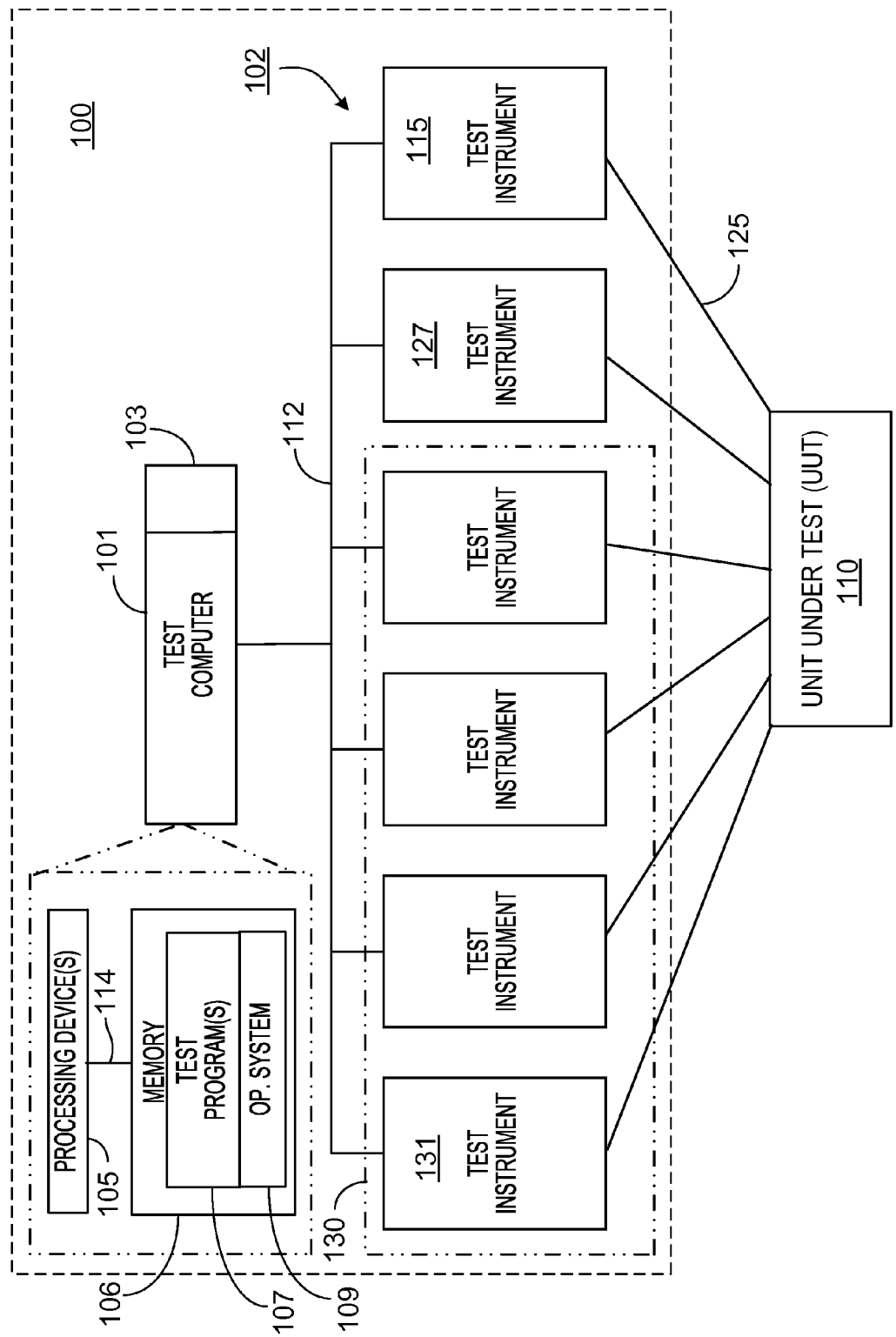
FIG. 1 is a block diagram of an example test system.

FIG. 1 shows an example test system 100. Test system 100 includes a test computer 101 and one or more test instruments 102. Test computer 101 includes ports 103. In this example, each port is associated with a peripheral bus that is supported by the test computer. Examples of peripheral buses that may be supported by the test computer include, but are not limited to, the following: Ethernet, RS232, USB 3.0 (universal serial bus), USB 2.0, SATA (serial advanced technology attachment), Firewire, VGA (video graphics adapter), HDMI (high definition multimedia interface), DVI (digital video interface), DisplayPort, SCSI (small computer systems interface), Audioport, and Thunderbolt. Test computer 101 may support other peripheral buses not described herein.

Test computer 101 includes one or more processing devices 105, which may include one or more microprocessors, one or more processor cores, and/or one or other devices as described herein. Test computer 101 also includes memory 106 storing instructions that are executable by the one or more processing devices. The instructions may define one or more test programs 107. Test programs 107 may be used to test a UUT 110. In an example implementation, UUT 110 may include avionics; however, any appropriate UUT may be tested by test system 100. In an example, the processing devices may execute a test program to send data to the UUT, to receive data back from the UUT in response to the sent data, and to make a determination about the UUT's health based on the received data. In some implementations, test computer 101 may be a single personal computer (PC). In some implementations, test computer 101 may include multiple PCs or other computing devices that act in concert to perform testing. The processing among such computers may be distributed, as appropriate.

The tests performed by a test program may include bus testing, which tests a bus supported by the UUT. For example, the UUT may send and receive communications over a peripheral bus, and the test program may perform one or more test operations to confirm that the peripheral bus is operating correctly, at least to within appropriate tolerances. Examples of peripheral bus protocols that may be supported by the UUT include, but are not limited to, Ethernet, RS232, USB 3.0 (universal serial bus), USB 2.0, SATA (serial advanced technology attachment), Firewire, VGA (video graphics adapter), HDMI (high definition multimedia interface), DVI (digital video interface), DisplayPort, SCSI (small computer systems interface), Audioport, and Thunderbolt. UUT 110 may support other peripheral buses not described herein. All or some of these buses may be the same buses that are supported by the test computer (in this example, the list of buses is the same). A system test user, therefore, may be tempted to connect the UUT directly to the test computer, via an appropriate test computer port, in order to test a peripheral bus on the UUT. However, for reasons explained above, such a connection can be problematic.

Accordingly, one of more of test instruments 102 may include circuitry to route communications having a peripheral bus protocol (such as those listed above) between the test computer and the UUT.

As shown in FIG. 1, in an example implementation, test system 100 includes a bus interface 112 to connect to an internal bus 114 of a test computer 101, and test instruments 102 to perform one or more testing operations on UUT 110. Test instruments 102 connect to bus interface 112 to enable communication between test computer 101 and test instruments 102. At least one of test instruments 102 includes the following: ports to which UUT 110 is connectable, where each port interfaces to a corresponding peripheral bus supported by the test instrument; conversion circuits to connect the bus interface to the peripheral buses, where each conversion circuit is configured to convert between a bus interface protocol run on the bus interface and a peripheral bus protocol run on a peripheral bus; and a switch to identify a target conversion circuit and to direct communications from the test computer to the target conversion circuit, and vice versa.

In some implementations, bus interface 112 is part of a bus backplane; however, this is not a system requirement. Bus interface 112 connects test instruments 102 to an internal bus on test computer 101. In an example, bus interface 112 includes a peripheral component interconnect (PCI) express (PCIe) bus that connects directly, or through one or more intermediary devices or buses, to an internal PCI express bus 114 on test computer 101. The connection may be made via an appropriate port on test computer 101 and an appropriate port on a bus backplane. In some implementations, the internal bus on test computer 101 and bus interface 112 may run or support a protocol other than PCI express.

Figure 2:
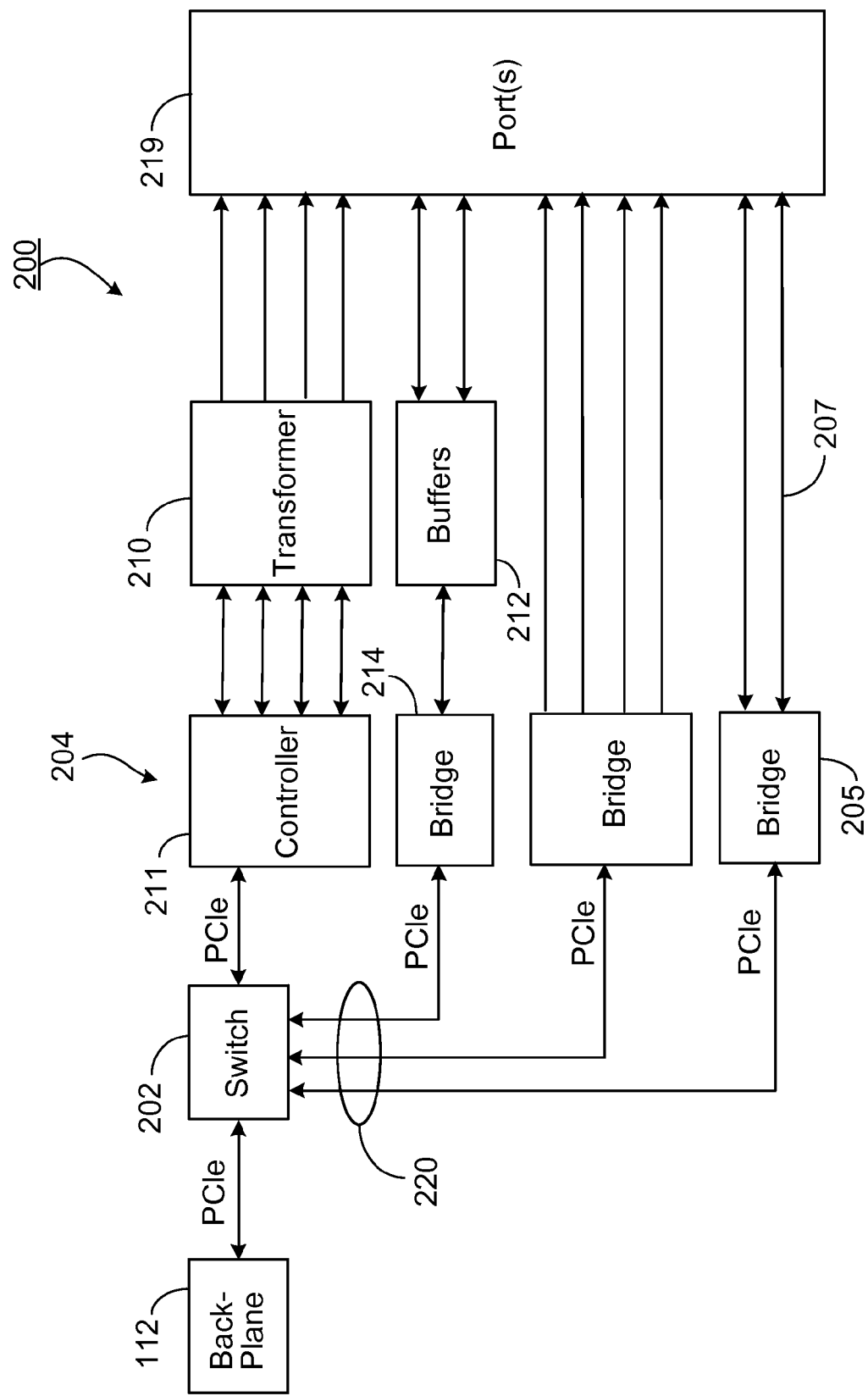
FIG. 2 is a block diagram of an example test instrument that may be used in the test system of FIG. 1.

Referring also to FIG. 2, in some implementations, the conversion circuits, the switch, and bus interface 112 are hardware-compatible with test computer 101 such that, from the perspective of the test computer 101, the circuits, the switch, and bus interface 112 appear to be part of test computer 101. For example, in an implementation where the test computer bus is a PCI express bus and the bus backplane used with, and inside, a test instrument is also a PCI express bus and the peripheral bus 125 is USB 3.0, then the USB 3.0 peripheral bus 125 will appear, to operating system 109 of test computer 101, to be one of ports 103 of test computer 101, rather than as an external component. The operating system in the test computer, in some implementations, thus detects and supports the circuits as if the circuits were ports in the computer system and not external components. A test program 107 running on test computer 101 could communicate with peripheral bus 125 via test instruments 102 as if it were included in ports 103.

The connections between the UUT 110 and instruments 102 may incorporate any appropriate buses. For an instrument that provides peripheral bus interfaces to the UUT (e.g., instrument 115), the interface(s) may be via any appropriate peripheral bus(es) that are to be tested by the test system. For example, test instrument 115 and UUT 110 may each include ports to enable peripheral bus connection between test instrument 115 and the UUT. In an example, test instrument 115 may include a USB 2.0 port; UUT 110 may include a USB 2.0 port; and a USB 2.0 bus may run between the USB 2.0 ports on the test instrument and the UUT to establish the connection.

FIG. 2 shows an example architecture 200 of test instrument 115, which enables communication between the test computer 101 and UUT 110 using one or more peripheral bus protocols. In this example, test instrument 115 uses PCI express buses; however, any appropriate bus, buses, or other communication media may be used in place of PCI express buses or in addition to PCI express buses.

In this example, test instrument 115 includes bus interface 112, which is a PCI express backplane in this example. Bus interface 112 connects, either directly or indirectly, to a PCI express bus 114 on test computer 101. Bus interface 112 also connects to a switch 202 via a PCI express bus. In this example, switch 202 is a smart switch. For example, switch 202 may include one or more processing devices and/or other circuitry (e.g., an application-specific integrated circuit (ASIC), a field programmable gate array (FPGA), and/or logic gates, etc.) to route communications originating from test computer 101 to UUT 110, and to route communications originating from UUT 110 to test computer 101.

In this regard, communications between test computer 101 and the test instruments may include data packets that are passed over PCI express bus(es). The data packets contain headers. Each header may identify the protocol of the peripheral bus to which the communication is directed. So, for example, a test program 107 running on test computer 101 may perform a test on a peripheral bus of UUT 110, such as a USB 2.0 bus. Communications to test that peripheral bus include data packets having packet headers that identify the peripheral bus protocol, in this example, USB 2.0. Switch 202 receives the data packets, identifies the peripheral bus protocol in the data packet header, and determines to which conversion circuit that the data packets for that communication should be routed.

In this example, test instrument 115 includes multiple conversion circuits 204. In some implementations, test instrument 115 includes a separate conversion circuit for each peripheral bus protocol that is supported by the UUT. The peripheral bus protocols may include, but are not limited to, any of the peripheral bus protocols described herein. In some implementations, one conversion circuit may be configured to convert from the bus interface protocol (e.g., PCI express) to multiple peripheral bus protocols (e.g., to both USB 2.0 and USB 3.0). In some implementations, multiple conversion circuits may be used to convert between the bus interface protocol and a single peripheral bus protocol. For the sake of illustration, the example below assumes that there is a separate conversion circuit for each peripheral bus protocol.

Example conversion circuits convert between PCI express and one of the following peripheral bus protocols: Ethernet, RS232, USB 3.0 (universal serial bus), USB 2.0, SATA (serial advanced technology attachment), Firewire, VGA (video graphics adapter), HDMI (high definition multimedia interface), DVI (digital video interface), DisplayPort, SCSI (small computer systems interface), Audioport, and Thunderbolt. The conversion circuits, however, are not limited to use with PCI express or to the foregoing peripheral bus protocols. For example, any appropriate one of the foregoing peripheral bus protocols may be used as the bus interface protocol in place of PCI express, and PCI express may be used as a peripheral bus protocol.

Each conversion circuit may include one or more processing devices and/or other circuitry (e.g., an application-specific integrated circuit (ASIC), a field programmable gate array (FPGA), and/or logic gates, etc.) configured to perform a conversion between the bus interface protocol and the appropriate peripheral bus protocol. For example, the conversion circuits may include bridge circuits (e.g., an RS232 bridge, USB 3.0 bridge, or SATA bridge) and/or controllers (e.g., an Ethernet controller). Each conversion circuit may be implemented on a separate, single hardware device, resulting in multiple hardware devices, or two or more (e.g., all) conversion circuits may be implemented on a single hardware device.

In operation, a conversion circuit 205 receives, from switch 202, data packets destined for a peripheral bus of UUT 110. Conversion circuit 205 converts the data packets from the bus interface protocol (in an example, PCI express) to the appropriate peripheral bus protocol. The converted data packets are then output on the appropriate peripheral bus 207, which is connected either to the conversion circuit or to intermediary circuitry. In the example provided above, conversion circuit 205 converts data packets from the PCI express protocol to the USB 2.0 protocol, and outputs the converted data packets onto a USB 2.0 bus 207 within test instrument 115. Any appropriate conversion processes may be executed by the conversion circuits to perform the conversions between protocols.

Test instrument 115 may also include buffers, transformers, or other circuitry to interface between the conversion circuit(s) and corresponding peripheral bus port(s) 219. For example, an Ethernet transformer 210 may be connected between an Ethernet controller conversion circuit (e.g., conversion circuit 211) and a peripheral bus port dedicated for use with Ethernet. In another example, an RS232 buffer 212 may be connected between an RS232 conversion circuit (e.g., conversion circuit 214) and a peripheral bus port dedicated for use with RS232. Intermediary circuitry other than that shown or described herein may also, or instead, be connected between various conversion circuit(s) and peripheral bus port(s).

In some implementations, test instrument 115 may include a separate port for each peripheral bus. For example, there may be a separate port for each of the following: Ethernet, RS232, USB 3.0 (universal serial bus), USB 2.0, SATA (serial advanced technology attachment), Firewire, VGA (video graphics adapter), HDMI (high definition multimedia interface), DVI (digital video interface), DisplayPort, SCSI (small computer systems interface), Audioport, and Thunderbolt. In some implementations, a single, configurable port may service and support multiple peripheral buses. In some implementations, multiple peripheral bus ports may each service and support multiple peripheral buses. For example, in an implementation, the same port may service and support both Ethernet and RS232. Any appropriate port configuration may be used.

Communications (e.g., data packets) provided via a port 219 are sent to UUT 110, and are used for bus testing or other appropriate purposes. In some implementations, UUT 110 may fetch the communications from the test instrument, whereas in other implementations the test instrument may output the communications to UUT 110. The connection between the UUT peripheral bus and corresponding peripheral bus port may be direct, or there may be intermediary circuitry (e.g., buffers, drivers, signal conditioning circuitry, or the like) in between the two. For example, a peripheral bus 125 (FIG. 1) may run between the UUT and the test instrument port.

As explained above, during testing, communications are sent from the test program (e.g., from test computer 101) to the UUT, and responses to those communications are sent from the UUT back to the test program. The test program analyzes those responses to identify defects in the UUT relating to the peripheral bus under test. Accordingly, communications from the UUT go via a peripheral bus from the UUT to a corresponding port on test instrument 115 (e.g., from the RS232 peripheral bus on the UUT to an RS232 port on the test instrument). As indicated above, a peripheral bus of the same type being tested is connected between the UUT and the corresponding test instrument port.

The communications from UUT 110 are in the peripheral bus protocol. Data packets for the communications are routed from the appropriate port, over the appropriate peripheral bus within test instrument 115, and to the appropriate conversion circuit or intermediary circuit. For example, the data packets may be stored in a buffer, from which they are sent to, or retrieved by, a conversion circuit. In another example, data packets may be sent directly from the port to the appropriate conversion circuit. Each conversion circuit is configured also to perform a reverse conversion, e.g., a conversion from the peripheral bus protocol to the bus interface protocol. Accordingly, when a conversion circuit receives data packets in the peripheral bus protocol, the conversion circuit identifies the peripheral bus protocol of the data packets, and performs a reverse conversion, e.g., a conversion from the peripheral bus protocol to the bus interface protocol (e.g., PCI express). For example, a USB 3.0 conversion circuit may receive data from the UUT in the USB 3.0 protocol, and convert that data to the bus interface protocol, e.g., PCI express. Any appropriate conversion processes may be executed by the conversion circuits to perform the conversions between protocols.

Converted data is output from the conversion circuit over a PCI express bus 220 in test instrument 115 to switch 202. Switch 202 routes the converted data in the bus interface protocol (which, as described above, is also used by the test computer) to bus interface 112 over a PCI express bus. From there, the data is sent to test computer 101 over one or more bus(es), e.g., over a PCI express bus. The test computer may then process the data, as appropriate, and provide an output indicating results of the test.

In some implementations, the test program is configured to override an operating system of the test computer in order to provide support for the one or more peripheral buses and corresponding ports. This is facilitated by using a bus, circuits, and a switch that, as described above, are hardware-compatible with test computer 101 so that, from a perspective of test computer 101, the bus, circuits, and switch appear to be part of the test computer. For example, if the operating system of the test computer no longer supports a particular peripheral bus protocol, the test program may be configured to support that protocol. In this example, for that protocol, the test program may override the operating system in the sense that it takes control over data output, and outputs that data in the appropriate peripheral bus protocol. For example, if the test computer's operating system no longer supports RS232, the test program may include one or more drivers to provide support therefor, and generate appropriate data packets for transmission over the PCI express bus, which will be converted to RS232. The test program may then send those data packets to the test instrument, as described above. Thus, even if a particular protocol becomes obsolete from the perspective of the test computer's operating system, using the test instruments described herein and an appropriate test program, a UUT that runs that peripheral bus protocol can still be tested.

Figure 3:
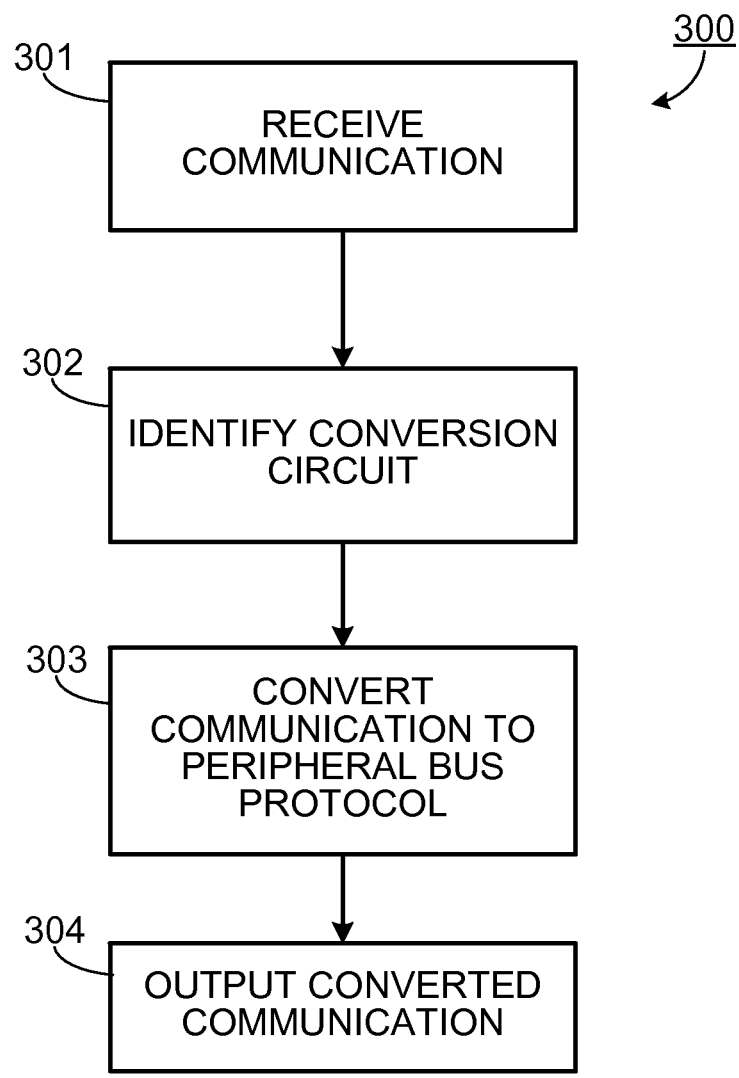
FIG. 3 is a flowchart showing an example test process that may be performed using the test system of FIG. 1.

FIG. 3 shows an example of a process 300 that is performed by test instrument 115. Process 300 includes receiving (301), at switch 202 and over bus interface 112, a communication from test computer 101. The communication is directed to one of multiple peripheral buses supported by test instrument 115 and UUT 110. The communication may include a header or other information that identifies an address of the conversion circuit to which the communication is directed. The process includes identifying (302), via switch (202), a conversion circuit corresponding to a target peripheral bus to which the communication is directed. For example, if the target peripheral bus is USB 3.0, the switch may identify a conversion circuit in test instrument 115 that is capable of converting between the bus interface protocol (e.g., PCI express) and USB 3.0. The process includes converting (303), via the identified conversion circuit, the communication from the bus interface protocol run on the bus interface to the target protocol, and outputting (304) the communication, following conversion, from the conversion circuit to the target peripheral bus on a path to the UUT. In the above example, data packets in the PCI express protocol are converted by circuit 201 to the USB 2.0 protocol, and those data packets are output to a USB 2.0 port on test instrument 115. From there, the data packets proceed over a USB 2.0 bus, and to the UUT, where they are processed or used for testing other purposes.

The systems and techniques for interfacing between a computer system and a device (e.g., UUT 110) are described in the context of a test system. However, the systems and techniques may be used in any appropriate context. For example, the systems and techniques may be used simply for communication between a computer system and any device, and can be particularly useful when the computer system no longer supports a protocol used by the device.

As described above, test system 100 may include multiple test instruments. One or more of those test instruments may have the same, or similar, configuration as test instrument 115 of FIG. 1. For example, one test instrument 115 may be used for communication using one set of protocols, and another test instrument 127 may be used for communication using another set of protocols. The protocols in these first and second sets may all be different; there may be some protocols in common; or the protocols may all be the same (e.g., for redundancy purposes).

Generally, some of the test instruments 130 may interface to UUT 110 to perform test functions other than bus testing. A test instrument may be configured to perform such testing alone, or in connection with testing performed via test computer 101. While this specification describes example implementations related to "testing" and a "test system," the devices and method described herein may be used in any appropriate system, and are not limited to test systems or to the example test systems described herein.

Testing performed as described herein may be implemented using hardware or a combination of hardware and software. For example, a test system like the ones described herein may include various controllers and/or processing devices located at various points. A central computer (e.g., test computer 101) may coordinate operation among the various controllers or processing devices. The central computer, controllers, and processing devices may execute various software routines to effect control and coordination of testing and calibration.

Testing can be controlled, at least in part, using one or more computer program products (such as a test program 107), e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions implemented by the test system described herein can be performed by one or more programmable processors executing one or more computer programs to perform the functions described herein. Actions implemented by the test system described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Generally, in a computing context, a bus includes any appropriate communication system for use in transferring data between components inside a computer or between different computers. The systems and techniques described herein may be usable with any appropriate bus architecture.

Any "electrical connection" as used herein may imply a direct physical connection or a connection that includes intervening components but that nevertheless allows electrical signals (including wireless signals) to flow between connected components. Any "connection" involving electrical circuitry mentioned herein, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A test system comprising:
a bus interface to connect to a bus of a computer system; and
test instruments to perform one or more test operations on a unit under test (UUT), the test instruments for connecting to the bus interface to enable communication between the computer system and the test instruments via the bus interface, at least one test instrument comprising:
ports to which the UUT is connectable, each of the ports interfacing to a corresponding peripheral bus supported by the at least one test instrument;
circuits to enable a connection path between the bus interface and the peripheral buses, each circuit being configured to convert between a bus interface protocol run on the bus interface and a peripheral bus protocol run on a peripheral bus; and
a switch to identify a target circuit of the circuits, the switch to direct communications from the computer system to the target circuit based on one more data packets that comprise the communication, the switch identifying a bus protocol associated with the target circuit based on the one or more data packets.

2. The test system of claim 1, wherein the one or more data packets comprise a header, the header comprising data corresponding to the bus protocol.

3. The test system of claim 1, wherein each circuit is configured to identify a communication from the UUT in a peripheral bus protocol, and to convert the communication from the peripheral bus protocol to the bus interface protocol.

4. The test system of claim 1, wherein the circuits comprise one or more of an Ethernet controller, an RS232 bridge, a USB3 bridge, a SATA bridge, a Firewire bridge, a VGA bridge, an HDMI bridge, a DVI bridge, a DisplayPort bridge, a USB2 bridge, a SCSI bridge, an Audioport bridge, or a Thunderbolt bridge.

5. The test system of claim 1, wherein the circuits and switch are hardware-compatible with the computer system such that, from a perspective of the computer system, the circuits and switch appear to be part of the computer system.

6. The test system of claim 5, wherein an operating system of the computer system is configured to detect and to support the circuits as if the circuits were ports of the computer system.

7. The test system of claim 6, wherein the operating system includes one or more drivers to support one or more bus protocols not supported by the operating system.

8. The test system of claim 1, further comprising:
the computer system, the computer system comprising memory storing instructions that are executable and one or more processing devices to execute the instructions to run one or more tests on the UUT, the communication being part of the one or more tests.

9. The test system of claim 8, wherein the instructions are part of a test program configured to provide support for one or more of the peripheral buses and corresponding ports.

10. The test system of claim 9, wherein the test program is configured to override an operating system of the computer system in order to provide the support for the one or more peripheral buses and corresponding ports.

11. The test system of claim 1, wherein the circuits are implemented on a single hardware device.

12. The test system of claim 1, wherein the circuits are implemented on multiple hardware devices.

13. A method of performing bus testing using a system comprising (i) a bus interface to connect to a bus of a computer system; and (ii) test instruments to perform one or more test operations on a unit under test (UUT), where the test instruments are connectable along a path to the bus interface to enable communication between the computer system and the test instruments via the bus interface, the method comprising:
receiving, at a switch and over the bus interface, a communication from the computer system, the communication being directed to one of multiple peripheral buses supported by the at least one test instrument;
identifying, via a switch, a conversion circuit corresponding to a target peripheral bus to which the communication is directed, the conversion circuit being identified based on one more data packets that comprise the communication, the switch identifying a bus protocol associated with the target circuit based on the one or more data packets;
converting, via the conversion circuit, the communication from a bus interface protocol run on the bus interface to the target protocol; and
outputting the communication, following conversion, from the conversion circuit to the target peripheral bus.

14. The method of claim 13, wherein the one or more data packets comprise a header, the header comprising data corresponding to the bus protocol.

15. The method of claim 13, wherein the conversion circuit identifies a communication from the UUT in a peripheral protocol, and converts the communication from the peripheral protocol to the bus interface protocol.

16. The method of claim 13, wherein the conversion circuit comprises one or more of the following: an Ethernet controller, an RS232 bridge, a USB3 bridge, a SATA bridge, a Firewire bridge, a VGA bridge, an HDMI bridge, a DVI bridge, a DisplayPort bridge, a USB2 bridge, a SCSI bridge, an Audioport bridge, or a Thunderbolt bridge.

17. The method of claim 13, wherein the conversion circuit and the switch are hardware-compatible with the computer system such that, from a perspective of the computer system, the conversion circuit and switch appear to be part of the computer system.

18. The method of claim 13, wherein the computer system comprises memory storing instructions that are executed by one or more processing devices to run one or more tests on the UUT, the communication being part of the one or more tests.

19. The method of claim 18, wherein the instructions are part of a test program configured to provide support for one or more of the peripheral buses and corresponding ports.

20. The method of claim 18, wherein the test program is configured to override an operating system of the computer system in order to provide the support for the one or more peripheral buses and corresponding ports.

21. The test system of claim 1, wherein the conversion circuit comprises one of a bridge circuit, a bridge circuit and a buffer, or a bridge circuit and a transformer.

22. The method of claim 13, wherein the conversion circuit comprises one of a bridge circuit, a bridge circuit and a buffer, or a bridge circuit and a transformer.

* * * * *